United States Patent [19]
Makibayashi et al.

[11] Patent Number: 4,781,361
[45] Date of Patent: Nov. 1, 1988

[54] VIBRATION-PREVENTING RUBBER DEVICE

[75] Inventors: Katsunori Makibayashi, Toyota; Kenji Murase, Suzuka; Motoo Kunihiro, Tsu, all of Japan

[73] Assignees: Toyota Jidosha Kabushiki Kaisha; Toyo Tire & Rubber Co., Ltd., both of Japan

[21] Appl. No.: 881,954

[22] Filed: Jul. 3, 1986

[30] Foreign Application Priority Data

Jul. 5, 1985 [JP] Japan .................................. 60-146581

[51] Int. Cl.⁴ .............................................. F16F 13/00
[52] U.S. Cl. .................................. 267/140.1; 180/312; 248/562; 248/636; 267/219
[58] Field of Search ..................... 267/140.1, 219, 220; 248/562, 636; 180/300, 902, 312

[56] References Cited

U.S. PATENT DOCUMENTS

| | | |
|---|---|---|
| 2,421,585 | 6/1947 | Thirty . |
| 2,540,130 | 2/1951 | Lee . |
| 2,555,347 | 6/1951 | Lee . |
| 2,562,195 | 7/1951 | Lee .................... 267/140.1 |
| 2,600,090 | 6/1952 | Barber et al. ........... 267/140.1 |
| 3,154,273 | 10/1964 | Paulsen ............... 267/140.1 X |
| 3,698,703 | 10/1972 | Hipsher . |
| 4,161,304 | 7/1979 | Brenner et al. . |
| 4,377,216 | 3/1983 | Ueno . |
| 4,383,679 | 5/1983 | Kakimoto .............. 248/562 X |
| 4,460,168 | 7/1984 | Obadal . |
| 4,572,488 | 2/1986 | Holmberg, Jr. et al. . |
| 4,573,656 | 3/1986 | Yoshida et al. . |
| 4,611,782 | 9/1986 | Ushijima et al. . |

FOREIGN PATENT DOCUMENTS

| | | |
|---|---|---|
| 37348 | 2/1984 | Japan . |
| 99133 | 6/1984 | Japan ................ 267/140.1 |
| 231236 | 12/1984 | Japan . |
| 1433772 | 4/1976 | United Kingdom . |
| 2041485 | 9/1980 | United Kingdom . |

Primary Examiner—George E. A. Halvosa
Attorney, Agent, or Firm—Parkhurst, Oliff & Berridge

[57] ABSTRACT

This invention relates to a vibration-preventing device wherein a partition wall is positioned outside of an inner cylinder and is interposed between an upper plate and a lower plate. The partition wall includes a hub portion. The upper plate and lower plate are connected to the inner cylinder. An upper vibration-preventing rubber member and an upper elastic film are interposed between the partition wall and the upper plate and cooperate to define an enclosure which functions as an upper damper liquid chamber. A lower vibration-preventing rubber member and a lower elastic film are interposed between the partition wall and the lower plate and cooperate to form an enclosure which functions as a lower damper liquid chamber. The upper damper liquid chamber communicates with the lower damper liquid chamber through an orifice. An elastic element in a cylindrical form or the like is interposed between confronting parts of an outer peripheral surface of the inner cylinder and an inner peripheral surface of the hub of the partition wall.

9 Claims, 2 Drawing Sheets

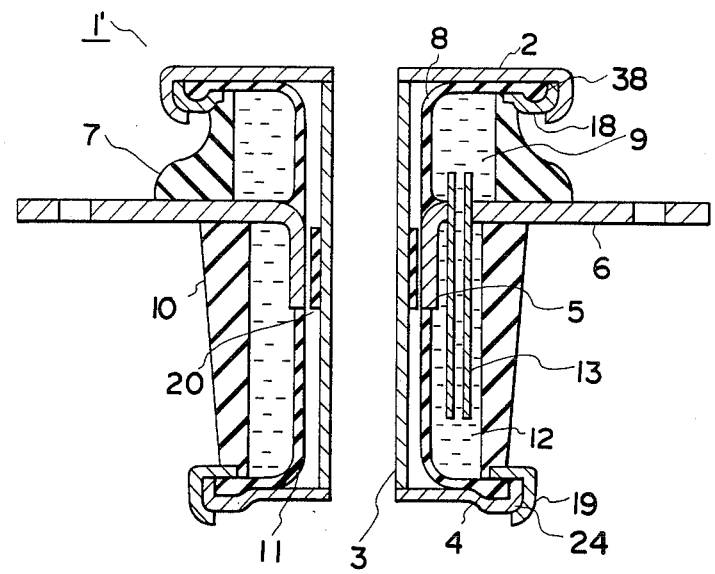
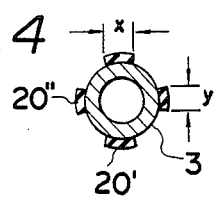
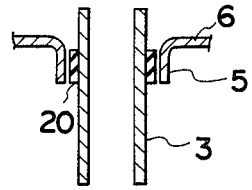
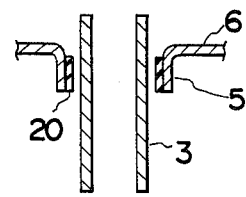

PRIOR ART

VIBRATION-PREVENTING RUBBER DEVICE

FIELD OF THE INVENTION

This invention relates to a mounting cushion which is used when a heavy article such as cabin is placed and fixed on, for example, the frame of an automobile.

BACKGROUND OF THE INVENTION

When the body of a cabin or the like is placed and fixed on the frame of an automobile, vibration-preventing rubber devices are interposed between the frame and the body so as to absorb and dampen vibrations. Thus, vibrations transmitted from tires to the frame during operation of the automobile may be prevented from propagating to the body.

In general, vibrations originating during the operation of vehicles have high and medium frequencies. Therefore, vibration-preventing devices having comparatively small spring constants are usually used to prevent vibrations. Such vibrationpreventing devices, however, do not satisfactorily dampen vibrations in a low-frequency region, such as, for example, vibrations attributable to undulations of the surface of a bad road.

Multiple mounting type vibration-preventing devices have been developed which not only absorb high- and medium-frequency vibrations but also dampen low-frequency vibrations.

As shown in FIG. 7, a multiple mounting vibration-preventing device 1 includes, for example, an upper plate 2, connected to a lower plate 4, by an inner cylinder 3. A partition wall 6, having a hub 5, fitted outside the inner cylinder 3, is interposed between the upper plate 2 and the lower plate 4.

An upper vibration-preventing rubber member 7, in the shape of a ring, is interposed between the partition wall 6 and the upper plate 2. An upper elastic film 8 is sealingly fixed inside the upper vibration-preventing rubber member 7 such that the lower end thereof is spliced to the hub 5 of the partition wall 6. The upper outer end of the upper elastic film 8 is sandwiched between the upper end of the upper vibration-preventing rubber member 7 and the upper plate 2. The outer end of the upper plate 2 is caulked. This structure defines an upper damper liquid chamber 9.

A lower damper liquid chamber 12 is defined as follows. A lower vibration-preventing rubber member 10, in the shape of a ring, is interposed between the partition wall 6 and the lower plate 4. A lower elastic film 11 is sealingly fixed inside the lower vibration-preventing rubber member 10. The upper end of the lower vibration-preventing rubber member 10 is spliced to the hub 5 of the partition wall 6, and the lower outer end thereof is sandwiched between the lower end of the lower vibration-preventing rubber member 10 and the lower plate 4. The outer end of the lower plate 4 is caulked.

The upper damper liquid chamber 9 and the lower damper liquid chamber 12 communicate through an orifice 13 provided in the partition wall 6. A damper liquid, which is a noncompressible fluid such as coolant, is tightly sealed in the chambers.

Outer peripheral parts of the partition wall 6 of the vibration-preventing rubber device 1 are clamped to the frame 14 of a vehicle by bolts and nuts. The body 15 of, for example, a cabin placed on the upper plate 2, is fixed by a bolt 16, inserted through the inner cylinder 3, and a nut 17. High-frequency and medium-frequency vibrations arising in the frame 14 during operation of the vehicle are absorbed by the vibrationpreventing members 7 and 10, while low-frequency vibrations are dampened by flow of the damper liquid through the orifice 13 communicating the damper liquid chambers 9 and 12. Thus, the vibrations from the relative up and down motion of the partition wall 6 and the inner cylinder 3 are attenuated under the damping action of the orifice 13.

The relationship between a frequency corresponding to a peak damping coefficient, namely, the resonance frequency $f_n$ of the damper liquid within the orifice 13, the volume modulus $k_l$ of the upper damper liquid chamber 9, the volume modulus $k_2$ of the lower damper liquid chamber 12, the aperture area S of the orifice 13, the length l of the orifice 13, and the specific gravity $\rho$ of the damper liquid, is as follows:

$$f_n \alpha \sqrt{S(k_1 + K_2/lp}$$

That is, the resonance frequency $f_n$ of the damper liquid may be lowered by reducing the aperture area S of the orifice 13, lowering the volume moduli $k_1$ and $k_2$ of the respective damper liquid chambers 9 and 12, or increasing the length of the orifice 13.

Regarding the relative vertical vibrations of the frame 14 of the vehicle and the body 15, the respective vibration-preventing rubber members 7 and 10 can reliably absorb the highfrequency and medium-frequency vibrations, and the damper liquid can reliably dampen the vibrations of the low-frequency region.

The vibration-preventing rubber members 7 and 10 can also absorb the high-frequency and medium-frequency vibrations from the shearing forces of relative horizontal vibrations of the frame 14 and the body 15. However, the prior art structure is disadvantageous in that the damping function of the damper liquid for the low-frequency vibrations is not satisfactory.

Another disadvantage is that the hub 5 of the partition wall 6 interferes with the inner cylinder 3 and vibrates. Moreover, the hub 5 generates noise and wears away.

SUMMARY OF THE INVENTION

This invention was developed in view of the foregoing background and to overcome the foregoing drawbacks.

It is accordingly an object of this invention to provide a vibration-preventing rubber device which adequately absorbs and dampens not only the relative vertical vibrations, but also the relative horizontal vibrations of the frame of a vehicle and the body of a cabin or the like, so as to enhance riding comfort and reduce noise.

These objects are achieved by providing a vibration-preventing device which includes an inner cylinder connected to an upper plate and a lower plate. A partition wall is provided outside the inner cylinder between the upper plate and lower plate. An upper vibration preventing rubber member and an upper elastic film are provided outside of the inner cylinder between the partition wall and the upper plate. An upper damper liquid chamber is defined by at least the upper vibration-preventing rubber member and the upper elastic film. Preferably, the partition wall also cooperates to define the upper damper liquid chamber.

Similarly, lower vibration preventing rubber member and a lower elastic film are provided outside of the cylinder between the partition wall and the lower plate. A lower damper liquid chamber is defined at least by the lower elastic film and lower vibration preventing rubber member, and preferably also by the partition wall. The lower and upper damper liquid chambers are held in communication by an orifice.

An elastic element is interposed between the inner cylinder and the partition wall.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein:

FIG. 1 is a vertical cross-sectional view of a vibration-preventing device according to a first embodiment of this invention;

FIG. 2 is a cross-sectional view of portions of the first embodiment;

FIG. 3 is a cross-sectional view corresponding to FIG. 2, showing another embodiment of this invention;

FIG. 4 is a cross-sectional view of yet another embodiment of this invention;

DETAILED DESCRIPTION OF THE PREFERRED EMBODIMENT

Figure 5:
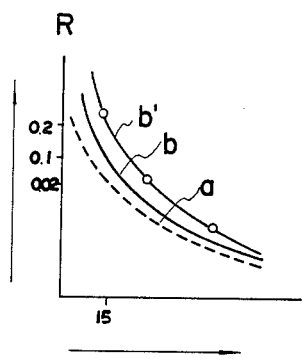
FIG. 5 is a graph showing a correlation between the damping coefficient and the frequency of horizontal vibrations.

The present invention will be described in detail with reference to the accompanying drawings which illustrate a preferred embodiment according to the present invention.

In the embodiment of the invention shown in FIGS. 1 and 2, 1' denotes a vibration-preventing rubber device. This embodiment is used, for example, to fix the cabin of a truck to a frame thereof. In the vibration-preventing rubber device 1', an upper plate 2 having an outer end which is substantially L-shaped in vertical cross-section is connected through an inner cylinder 3 to a lower plate 4 having an outer end recess 24 which is substantially U-shaped in vertical cross-section.

A partition wall 6 having a hub 5 is interposed between the upper plate 2 and the lower plate 4. The hub 5 is fitted outside the inner cylinder 3. An upper vibration-preventing rubber member 7, which is in the shape of a ring and which is provided at its upper end with a fixture 18 substantially Ushaped in vertical section, is interposed between the partition wall 6 and the upper plate 2. An upper elastic film 8 is sealingly fixed inside the upper vibration-preventing rubber member 7 as follows. The lower end 28 of the upper elastic film 8 is vulcanized and spliced to the upper part 25 of the hub 5 of the partition wall 6. The upper outer end 38 of the upper elastic film 8 is sandwiched between the fixture 18 of the upper vibration-preventing rubber member 7 and the upper plate 2. The L-shaped outer end of the upper plate 2 is caulked.

A lower vibration-preventing rubber member 10, which is in the shape of a ring and which is provided at its lower end with a fixture 19, having an inverted L-shaped vertical cross-section, is interposed between the lower plate 4 and the partition wall 6. A lower elastic film 11 is sealingly fixed inside the lower vibration-preventing rubber member 10 as follows. The upper end of the lower elastic film 11 is vulcanized and spliced to the lower part of the hub 5 of the partition wall 6. The lower outer end of the lower elastic film 11 is sandwiched between the fixture 19 of the lower vibration-preventing rubber member 10 and the outer end recess 24 of the lower plate 4. The fixture 19 is caulked.

An upper damper liquid chamber 9, which is defined by a space between the upper vibration-preventing rubber member 7, the upper elastic film 8 and the partition wall 6, and a lower damper liquid chamber 12, which is defined by a space between the lower vibration-preventing rubber member 10, the lower elastic film 11 and the partition wall 6, communicate through an orifice 13 provided in the partition wall 6. A damper liquid, such as coolant, is tightly sealed in the chambers.

An elastic element 20 in the shape of a ring, which is made of natural rubber (hereinafter 'NR') of high damping coefficient, is vulcanized and spliced to the outer peripheral surface of the inner cylinder 3, and confronts the inner peripheral surface of the hub 5 of the partition wall 6 in an equilibrium state under which the damper liquid does not flow through the orifice 13. A predetermined gap is formed between the outer peripheral surface of the elastic element 20 and the inner peripheral surface of the hub 5, so as to permit the partition wall 6 and the inner cylinder 3 to move vertically relative to each other.

The vibration-preventing rubber device 1' is clamped to a frame 14 by outer peripheral parts of the partition wall 6 by bolts and nuts, and a cabin 15, placed on the upper plate 2, is fixed by a bolt and a nut inserted through the inner cylinder 3.

In the above construction, the upper vibrationpreventing rubber member 7 and the lower vibration-preventing rubber member 10 support a static load applied from above, and they absorb the components of the relative vertical vibrations as well as the relative horizontal vibrations of the frame 14 and the cabin 15 in high-frequency and medium-frequency regions.

The components of the aforementioned relative vertical vibrations in a low-frequency region are dampened so that the mutual vertical flows of the damper liquid are subjected to a damping action by the orifice 13, which communicates the upper damper liquid chamber 9 with the lower damper liquid chamber 12.

The aforementioned relative horizontal vibrations, not only in the high- and medium-frequency regions but also in the low-frequency region, are absorbed and dampened by the elastic element 20 when the outer peripheral surface of the elastic element 20 and the inner peripheral surface of the hub 5 abut because of relative horizontal vibrations of the inner cylinder 3 and the partition wall 6, so that the vibration transmission from the frame 14 to the cabin 15 is reduced.

Accordingly, the vibration-preventing rubber device 1', satisfactorily absorbs and dampens all the components of the relative vertical vibrations and relative horizontal vibrations of the frame 14 and the cabin 15 in the high-frequency, medium-frequency and low-frequency regions. Therefore, a more comfortable ride in the car is provided and noise inside and outside the car is reduced.

FIG. 3 shows another embodiment of the invention in which the elastic element 20 is spliced to the inner peripheral surface of the hub 5 of the partition wall 6. FIG. 4 shows still another embodiment of the invention in which the elastic element 20 is divided in four and in which, when any desired orthogonal X- and Y-directions are taken in a horizontal plane, elastic elements 20', each having a width x, are spliced to the X-directional parts of the outer peripheral surface of the inner cylinder 3, while elastic elements 20'' each having a width y smaller than the width x are spliced to the Y-directional parts of the same. In the embodiment of FIG. 4, a spring rigidity in the X-direction can be set higher than in the Y-direction.

The material of the elastic elements 20, 20' and 20'' is not restricted to NR, but may well be a synthetic rubber such as isobutylene isoprene rubber (hereinbelow, abbreviated to 'IIR').

FIG. 5 is a graph showing the correlations between the damping coefficient on the ordinate axis and the frequency [Hz] on the abscissa. The broken line a shows the prior art vibration-preventing rubber device 1. Solid lines b and b' correspond to the vibration-preventing rubber devices 1' of this invention. The solid line b shows a device using the elastic element 20 made of NR, while the solid line b' shows a device using the elastic element 20 made of IIR. In both devices, the damping coefficients are greater than in the prior art vibration-preventing rubber device 1 over the entire frequency region.

Figure 6:
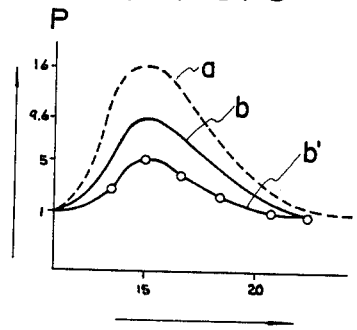
FIG. 6 is a graph showing a correlation between the vibration transmission factor and the frequency of horizontal vibrations.
Figure 7:
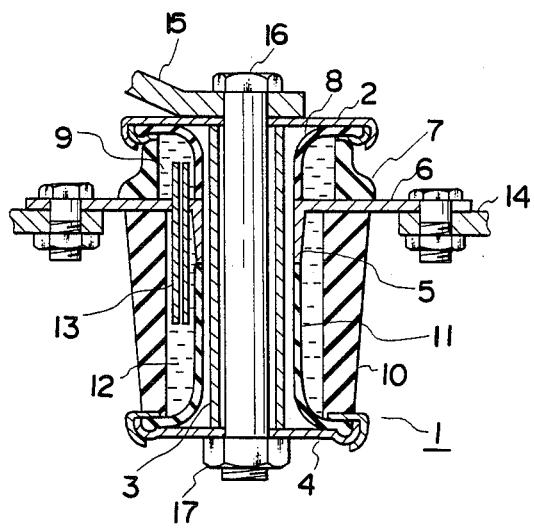
FIG. 7 is a vertical cross-sectional view corresponding to FIG. 1, showing a prior art vibration-preventing rubber device.

FIG. 6 is a graph showing the correlations between the vibration transmission factor P of the relative horizontal vibrations shown on the ordinate and the frequency [Hz] shown on the abscissa. The broken line a corresponds to the prior art vibration-preventing rubber device 1. Solid lines b and b' correspond to the vibration-preventing rubber device 1' of this invention. Solid line b shows the correlation for a device using the elastic element 20 made of NR. Solid line b' shows the correlations for a device using the IIR elastic element 20. In both embodiments employing the different materials, the vibration transmission factors are less than in the prior art vibration-preventing rubber device 1 over the entire frequency region.

This invention is not restricted to the foregoing embodiment, but various other aspects or embodiments can be adopted. For example, the elastic element may be fitted loosely between the inner cylinder and the partition wall.

According to the invention as described, the relative vertical vibrations and relative horizontal vibrations of the frame of an automobile and a body to be placed and fixed on the frame are absorbed and dampened by a vibration-preventing rubber device in all of the frequency regions (e.g., high-frequency, medium-frequency and low-frequency regions), thereby enhancing the ride of the vehicle and reducing noise inside and outside the vehicle.

More specifically, a partition wall, which is fitted outside an inner cylinder, is interposed between an upper plate and a lower plate which are connected to the inner cylinder. An upper vibration-preventing rubber member is interposed between the partition wall and the upper plate, and a lower vibration-preventing rubber member is interposed between the partition wall and the lower plate. Thus, the components of the relative vertical vibrations and relative horizontal vibrations of the frame of a vehicle and a body in high-frequency and medium-frequency regions are absorbed by the upper vibration-preventing rubber member and the lower vibration-preventing rubber member.

In addition, an upper damper liquid chamber formed on the upper side of the partition wall and a lower damper liquid chamber formed on the lower side of the partition wall communicate through an orifice, thereby achieving the beneficial effect that the vertical flow of a damper liquid between the upper damper liquid chamber and the lower damper liquid chamber undergo the damping action of the orifice, so that the components of the aforementioned relative vertical vibration in a low-frequency region are dampened.

Further, an elastic element is interposed between the confronting parts of the inner cylinder and the partition wall thereby achieving the beneficial effect that the components of the aforementioned relative horizontal vibrations, not only in the high-frequency and medium-frequency regions but also in the low-frequency region, are absorbed and damped by the elastic element, thereby providing quiet operation of the vehicle.

Accordingly, the vibration-preventing rubber device satisfactorily absorbs and dampens vibrations for all the components of the relative vertical vibrations and relative horizontal vibrations of the frame and the body in the high-, medium- and low-frequency regions. Thus, vibration transmission from the frame to the body is reduced, thereby greatly enhancing the ride of the vehicle.

The device also reduces the vibrations of the body, thereby reducing noise resulting from these vibrations and effecting a silent ride inside and outside of the vehicle.

While the preferred embodiment of the invention has been described, it is to be understood that the invention is not limited thereto, and may be otherwise embodied within the scope of the following claims.

What is claimed is:

1. A vibration-preventing device comprising:
    an inner cylinder;
    an upper plate;
    a partition wall having a hub portion extending substantially parallel to said inner cylinder;
    a lower plate, said partition wall being positioned outside of said inner cylinder and being interposed between said upper plate and said lower plate, said upper plate and said lower plate being connected to the inner cylinder;
    an upper vibration-preventing rubber member interposed between the partition wall and the upper plate;
    an upper elastic film interposed between the partition wall and the upper plate, said upper vibration-preventing rubber member and said upper elastic film cooperating to define an upper damper liquid chamber;
    a lower vibration-preventing rubber member interposed between the partition wall and the lower plate;
    a lower elastic film interposed between the partition wall and the lower plate, said lower vibration-preventing rubber member and said lower elastic film cooperating to define a lower damper liquid chamber;
    an orifice which fluidly communicates said upper damper liquid chamber with said lower damper liquid chamber; and an elastic element outside of said damper liquid chambers and independent of said upper and lower elastic film, interposed between said inner cylinder and said hub of said partition wall, said elastic element being substantially axially coextensive with said hub, being in direct contact with one of said inner cylinder and said hub of said partition wall and, in the unloaded condition, being spaced from and out of direct contact with the other of said inner cylinder and said hub of said partition wall and cooperating to dampen low frequency vibrations, intermediate frequency vibrations and upper frequency vibrations with said vibration-preventing members.

2. The vibration-preventing device according to claim 1, wherein said inner cylinder includes an outer peripheral surface and said elastic element is spliced to said outer peripheral surface.

3. The vibration-preventing device according to claim 1, wherein said elastic element is in the shape of a round pipe.

4. The vibration-preventing device according to claim 1, wherein said elastic element is divided in a peripheral direction thereof.

5. The vibration-preventing device according to claim 4, wherein the divided portions of said elastic element have unequal spring rigidities.

6. The vibration-preventing device according to claim 1, wherein said partition wall includes an inner surface and said elastic element is spliced to said inner surface.

7. The vibration-preventing device according to claim 1, wherein said elastic element is loosely interposed between said inner cylinder and said partition wall.

8. The vibration-preventing device according to claim 1, wherein said partition wall also cooperates to define said upper damper liquid chamber.

9. The vibration-preventing device according to claim 1, wherein said partition wall also cooperates to define said lower damper liquid chamber.

* * * * *